United States Patent [19]

Söder

[11] Patent Number: 4,531,720
[45] Date of Patent: Jul. 30, 1985

[54] DEVICE FOR SUPPORTING WORKPIECES IN DIFFERENT POSITIONS

[75] Inventor: Sven-Harry Söder, Kinna, Sweden

[73] Assignee: Harry Söder & Son Stenhuggeri AB, Kinna, Sweden

[21] Appl. No.: 514,807

[22] PCT Filed: Oct. 18, 1982

[86] PCT No.: PCT/SE82/00336
§ 371 Date: Jun. 16, 1983
§ 102(e) Date: Jun. 16, 1983

[87] PCT Pub. No.: WO83/01436
PCT Pub. Date: Apr. 28, 1983

[30] Foreign Application Priority Data
Oct. 19, 1981 [SE] Sweden ................................ 8106144

[51] Int. Cl.³ .............................................. B23Q 1/04
[52] U.S. Cl. ..................................... 269/71; 414/563;
414/11; 269/76; 269/78; 269/208; 269/905
[58] Field of Search .......................... 269/69, 71, 76, 77,
269/78, 88, 208, 910, 905; 414/11, 563, 718;
254/2 R, 2 C, 3 R, 3 C, 134

[56] References Cited
U.S. PATENT DOCUMENTS

| 2,188,433 | 1/1940 | Friese | 269/78 |
| 2,828,870 | 4/1958 | Corley | 414/11 |
| 2,964,293 | 12/1960 | Foth | 414/11 |
| 3,923,167 | 12/1975 | Blankenbecker | 414/11 |
| 4,199,299 | 4/1980 | Petitto et al. | 414/718 |

Primary Examiner—Frederick R. Schmidt
Assistant Examiner—Judy J. Hartman

[57] ABSTRACT

A support member (2), on which the object is intended to rest, and a base member (1) which carries the support member. The base member (1) consists mainly of a fixed frame (6) and an expanding column (9) hinged to the frame which carries the support member (2). The column by expansion or contraction can raise or lower the support member. Between the frame and the column is attached a control contrivance (13) for positioning the column between different swing positions. At a lower end position, in which the support-member is to a high degree obliquely positioned, the member can connect with a unit at a lower level, from which the workpiece can be lifted to a desired higher level. The support member also has elements (28) to ensure that the workpiece is held securely in position in all support-member attitudes.

5 Claims, 3 Drawing Figures

DEVICE FOR SUPPORTING WORKPIECES IN DIFFERENT POSITIONS

TECHNICAL FIELD

The following invention relates to a device for supporting workpieces in various positions for the purpose of machining, having a support member on which the workpiece is intended to rest and a base member which carries the support member.

BACKGROUND

In various applications there is a demand, e.g. in industry, for machines to hold workpieces in different positions in order to machine them. For this purpose there exists a so-called lifting table which ordinarily consists of a base with scissor-action adjustment links, imparting a raising and lowering movement to the table on which the workpiece is resting. This table, however, has a base which requires a comparatively large space and provides limited facilities for placing it in different positions.

TECHNICAL PROBLEM

The aim of the present invention is to produce a device enabling objects to be supported and moved from point to point within very wide limits.

SOLUTION

The said purpose can be achieved by a device in accordance with the present invention characterized in that the base member consists primarily of a fixed frame and a column which is expandable and tiltable by means of a first hinge device in the frame, said column carrying the support member and being equipped to raise and lower the support member by expansion and contraction respectively, in that the column is executed as a piston cylinder, the cylinder of which pivots in the frame and to the piston rod to which the support member is attached, and in that the support member is rotatable between different rotating positions around the longitudinal axis of the column in that, between the frame and the pillar is attached a maneuverable appliance designed to adjust the column between and to retain it in different swing positions with a lower end position, in which the support member is to a high degree obliquely positioned and can be connected by a section to a lower level, from which the workpiece can be lifted to a desired higher level, and in that the support-member exhibits, at least in its lower section in the oblique position, projecting carrier elements for transporting the workpiece while it is being lifted by the device and for retaining the workpiece in position in all positions of the support member.

BRIEF DESCRIPTION OF DRAWINGS

The invention is described below in relation to a preferred embodiment with reference to the drawings attached, where.

BEST MODE OF CARRYING OUT THE INVENTION

Figure 1:
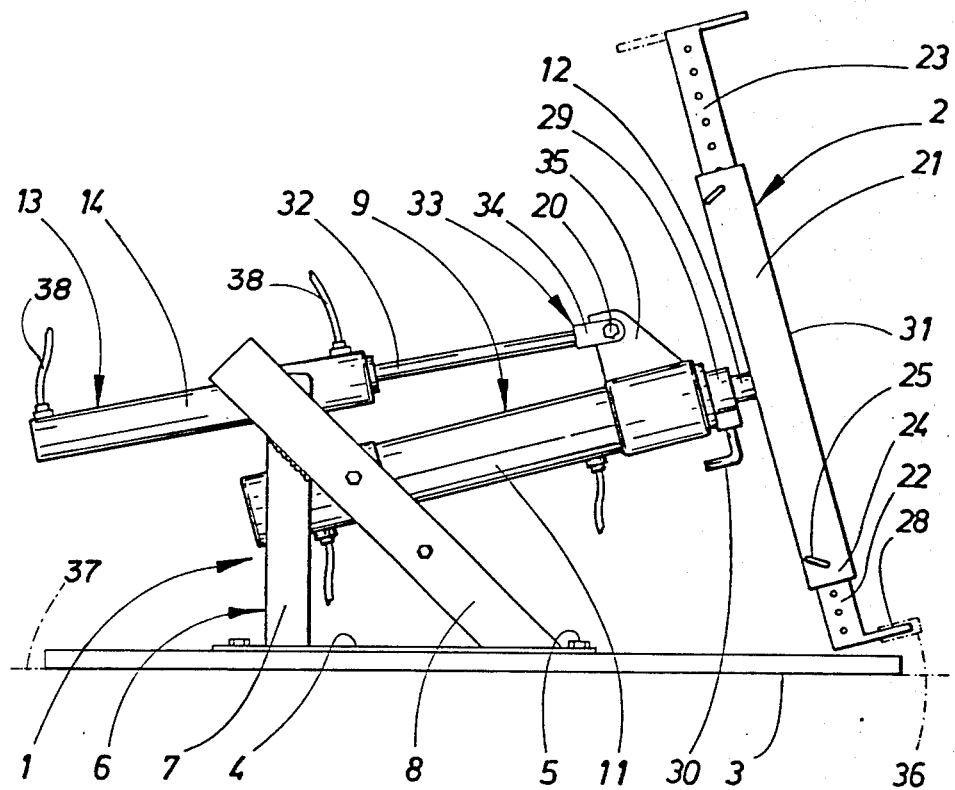
FIG. 1 shows a side view of the device according to the invention in a downwards pivoted position.

As will be apparent from the figures, the device in accordance with the invention comprises a base-member 1 and a support-member 2, which is carried by the base-member. The support-member 2 is designed to carry workpieces of different types depending on the actual area of application. The device shown in the figures is specially designed to carry heavier workpieces for the purpose of their machining, for example stone blocks for grinding, engraving or chiselling for instance in the manufacture of gravestones. The base-member comprises a base plate 3 to which a solid frame 6 is attached by means of two fastening plates 4 and fastening screws 5. The base plate 3 can normally rest without any fastening devices on a foundation 37, e.g. a floor, shown by a dotted line. The solid frame consists of two vertical frame-members 7, located apart from each other, which give support to two oblique—and frame members 8 similarly placed apart from each other. These frame-members 7 and 8 are made in the form of e.g. box profiles. In the base section 1 there is additionally a column 9 which at the bottom can be swung by a hinge device 10 between the two obliquely-situated frame members 8. The hinge device 10 may be composed, for instance, of a sleeve passing around the column with side-pointing pins which extend into an aperture acting as a bearing in each of the two obliquely-placed frame-members 8. The column 9 is of telescopic type and equipped to carry the support member 2 and, in the example shown, is executed as a piston cylinder, whereby the cylinder 11 is hinged to the base member 1 and the piston rod 12 is connected at the top with the support member 2. By means of the piston cylinder 9, which might be of e.g. hydraulic type and double action, the support member 2 may be installed at different heights by allowing the piston rod 12 to assume varying projection positions, as shown by the dotted lines in FIG. 2. Additionally, the support member 2 together with the piston rod 12 can be pivoted on its longitudinal axis in relation to the cylinder piston 11.

To maneuver the column 9 between the different pivot positions the device in accordance with the invention is equipped with a maneuvering contrivance 13 of expanding type which, in the example shown, has been executed as a second piston cylinder with its cylinder 14 hinged on the base-member 1 and in particular on the two obliquely situated frame members 8 to a second hinge device 15, situated at a distance from the first-named hinge device 10. The piston cylinder's piston rod 32, through a third hinge device 33, is connected in an articulated fashion to the cylinder of the column 9 at its upper end. The hinge device 33 consists of a U-shaped element 34, extending from the cylinder 14 with both its legs on each side of a platform-shaped projection 35, whereby projection 35, in common with U-shaped element 34, has holes situated in line with each other, through which a screw 20 extends to serve as a pivot pin for the hinge device. The control device 13, too, should preferably be of hydraulic type and double acting so that both expansion and contraction movements may be carried out, enabling the columns 9 to be repositioned between various pivoting positions.

The support member 2, like base member, 1, should preferably be constructed of box profiles and in the example shown has the general appearance of an "H", with a cross piece 16, which is connected to and carried by the piston rod 12 of the column 9 and two side pieces 17 and 18, running parallel with each other. The cross-piece 16 is thus attached at both ends transversely to the center of each of the two side-pieces 17 and 18. The side-pieces 17 and 18 are therefore connected by the cross-piece and can be telescopically extended, since each has a middle section 21 and two end sections 22 and 23, which are of a smaller dimension snd hence fit in terms of both shape and size into the cavity of the middle section and can be advanced inside the latter and guided by the inner walls of the center section. The sections 22 and 23 are of such a length that in all positions they project somewhat into the center section 21 and for example have a length either the same as or somewhat in excess of half that of the center section 21. The end sections 22 and 23 can be locked in any desired position, which is achieved in the example shown by the fact that the center section 21 has a peg 25 at each end 24 which, when locked in the desired position, is inserted into holes through both the center section and the end sections 22 and 23. For this purpose the end sections are equipped with a number of apertures drilled in a row, ensuring that a suitable hole can be selected after the choice of a withdrawal position for the relevant end section. Adjustment of the support member 2, and hence of the four end sections 22 and 23, is carried out so as to adapt to the size of the actual object to be supported by the support member. The object 26, which is presumed to have the shape of the dotted lines in FIG. 2, is thus supported by the upturned surfaces 31 of support member 2, in particular by the upturned surfaces of the cross piece 16 and the middle sections 21 of side pieces 17 and 18, while retention of position against movement across these support surfaces is ensured by projecting stops 28 at each extremity of the end-sections 22 and 23. Each end section 22 and 23 together with the relevant stop 28 can be turned individually so that the stop element 28 can be directed downwards, as indicated by dotted lines in FIGS. 1 and 3. In this manner the support element 2 can carry workpieces 26 of greater dimensions than the maximum span between the stop elements 28.

Figure 2:
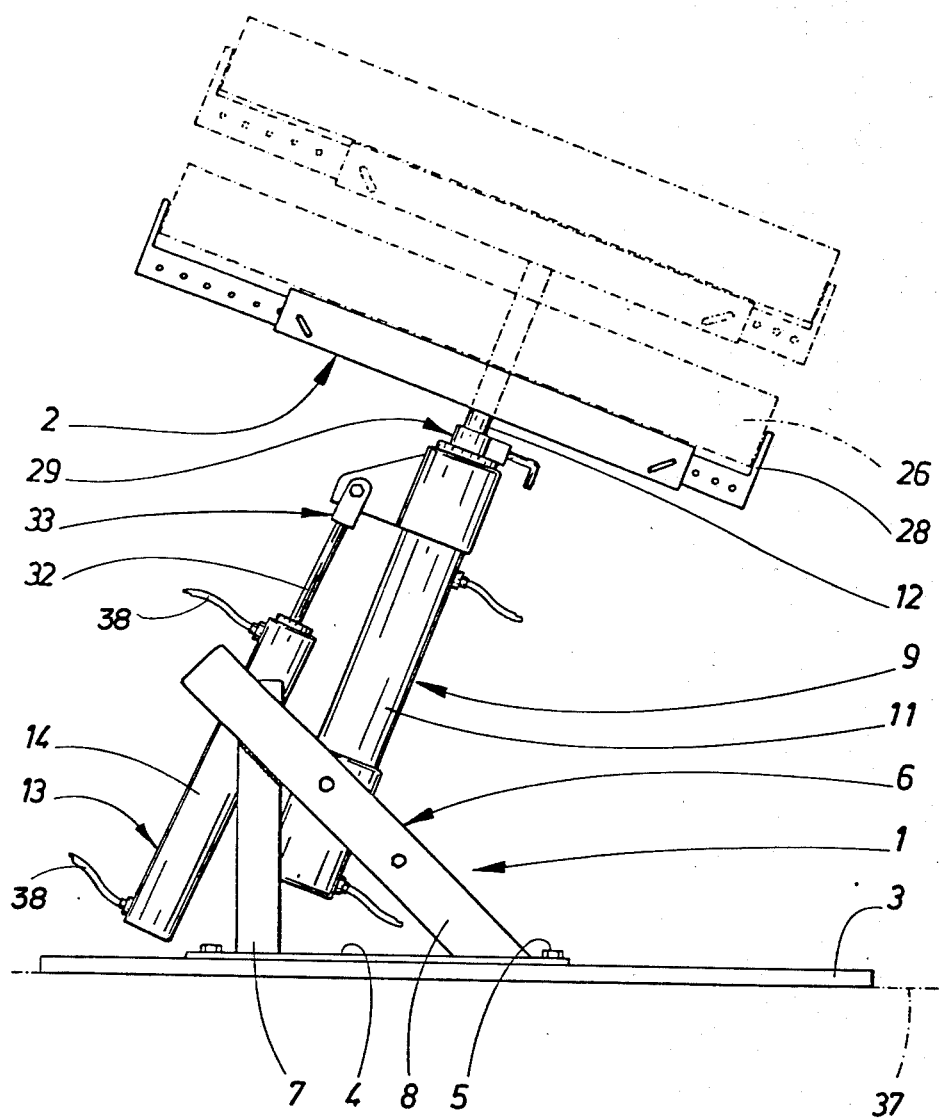
FIG. 2 shows the device in accordance with the invention in a partly upwards pivoted but still oblique position and with dotted lines in a raised position in a support-member entering the device.
Figure 3:
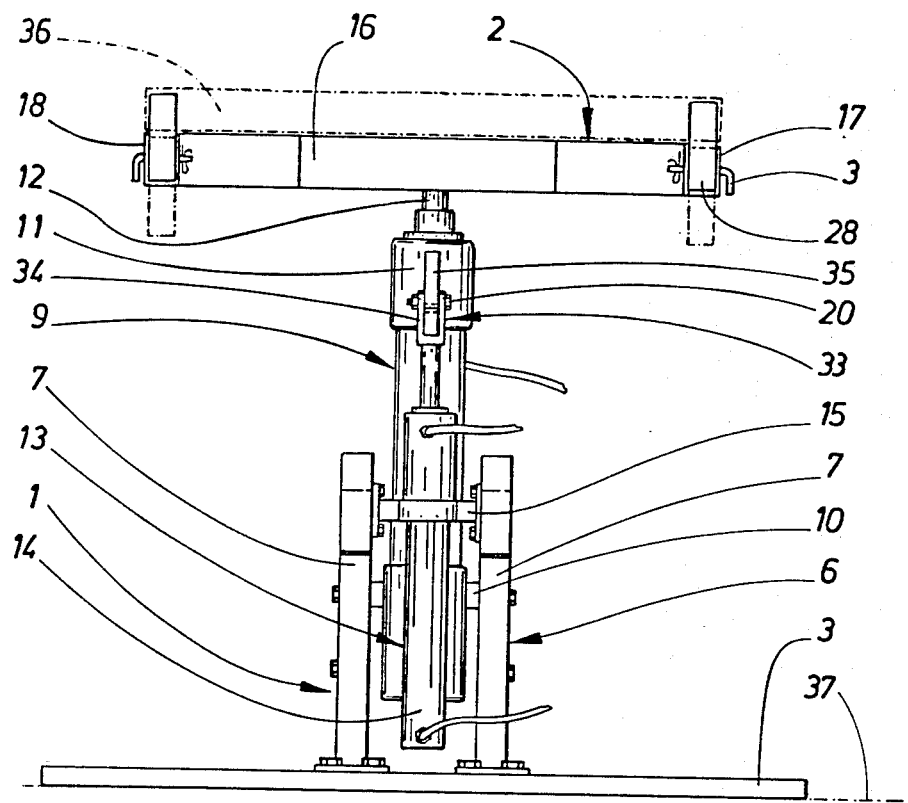
FIG. 3 shows a plan of the invention in a vertically pivoted position.

FIGS. 1 and 3 show by dotted lines a spar 36 which can be attached to the stop elements 28 and extends between them alongside one or both sides of support member 2. This is used in, for example, cases where the distance between the two stop elements 28 is larger on one side or the other than the width of the workpiece. Alternatively, the workpiece may be of such a shape that a continuous support is to be preferred.

The preferred embodiment of a device in accordance with the present invention has a locking device 29 for telescopic column 9. This locking device 29 is designed to lock the piston ring 12 in a desired position in accordance with the set height of the support member 2. In the example shown the locking appliance consists of two locking jaws anchored at the top to the upper end of the cylinder 11 and arranged so that by means of a level 30 they can be rearranged between a releasing and a locking position, in which the locking jaws are mechanically gripped against the piston 12 and thereby retain the latter. This locking appliance 29 holds the support member 2 in a desired rotating position relative to the longitudinal axis of the column 9. Additionally, the locking device incorporates a safety device to ensure that the support member 2 and hence the workpiece are securely held in the desired position, even where the desired position can be ensured by blocking the hydraulic fluid with valves after the desired operation of the cylinder 11.

In the case of the control contrivance 13, in the example shown, it is however, considered necessary to retain the selected adjustment position by blocking the hydraulic fluid by valves, connected to the connecting leads 38, which are coupled to both sides of cylinder 14 of the piston cylinder.

By means of the device in accordance with the present invention it is also possible to mount support member 2, and hence the workpiece 26 carried by it, in a number of different positions within very wide limits. Adjustment can thus be made between various inclined positions by the activation of the control contrivance 13 and by locking this in the desired position. Adjustment between different heights is carried out by operation of the piston cylinder serving as the column 9 for the support member so that for a selected inclined position the support member may be raised or lowered in a straight line by the appropriate extension or shortening of the column 9. As suggested above, adjustment may also be carried out between different rotational positions around the longitudinal axis of the column since the piston rod 12 may be turned relative to the cylinder 11. Furthermore, the support member 2 may be adjusted with regard to its extension by lengthening or shortening the side-pieces 17 and 18.

According to the invention, the column 9 and hence the support member 2 can be sharply tilted by expansion of the control contrivance 13 to the point where one end of the support member, specifically the two end sections 22, make contact with the foundation, in this case the base plate 3. In this way it is possible for the actual object 26, for example a heavy workpiece, to be placed on the support member 2, for example by advancing a fork-lift truck with its forks penetrating the sides of the side pieces 17 and 18 and to be positioned on the stops 28, situated immediately below and inclined towards the carrier surfaces 31 of the support member 2. If necessary, the upper stops 28 can be turned and additionally the separate stop spar 36 may be attached. Thereafter the object may be raised from approximately ground level to the desired working position by operation of the control contrivance 13, to produce contraction, as a result of which the column 9 is made to swing up to the desired position. Once the desired inclined position has been achieved, the desired height position is adjusted by operation of the piston cylinder serving as the column 9, when the piston cylinder will be caused to expand and the support member 2 will be raised to the required height. The desired rotational position is then set in the support member 2 by rotating the latter around the longitudinal axis of the column 9, whereupon the device is locked at the set height and in the rotational position by rotating the bar 30 and thus clamping the piston rod 12 by means of jaws in the locking device. For various types of work it may be desirable to retain the ability to rotate the support member while the work is in progress, in which case the locking device 29 is kept in its releasing position. This ability to rotate is obtained by causing the piston rodd 12 to rotate in the conventional way around its longitudinal axis relative to the cylinder 11. Alternatively, the support member 2 may naturally be mounted at the upper end of the piston rod 12, so that the support member can be rotated around the piston rod.

The adjustment of the support member 2 in relation to its extension may conveniently be carried out in two stages. The first stage involves making a rough adjustment to the support member 4, whereby the two downwards-pointing end pieces 22 with the device in its downward-tilted position are set according to assessment or measurement of the size of the object, said adjustment being performed before the object is placed on the support member 2. The second adjustment stage may conveniently be made after the object has been placed on the support member 2. Prior to this, care must be taken that both end pieces 23 situated at the top are sufficiently extended for the object to find room on the support member, whereupon the two end pieces are inserted to the point at which the stops 28 engage with the lateral surface of the object.

The foregoing has not given a detailed description of the hydraulic system for control of the two piston cylinders. It may however be of conventional type and be executed with a hydraulic pump which pumps hydraulic fluid from a hydraulic liquid tank and builds up hydraulic pressure on one or other side of the piston in the respective piston cylinder for expansion or contraction. For the control of the hydraulic fluid pressure at least one valve is necessary for each piston cylinder, said valve being capable of being set to any of three positions, one to control the flow of hydraulic fluid to the side of the piston cylinder providing expansion; a second position to control the flow of hydraulic fluid to the other side of the piston cylinders providing compression; and a position for closing the connection to the piston cylinder, whereby a selected position is maintained. Restrictor valves should preferably also be incorporated so as to ensure smooth and even movements.

The invention is not limited to the embodiment specified above and illustrated in the drawings, but may be varied within the scope of the following Patent Claims. It might, for example be envisaged that the device be manufactured in a less cumbersome version, intended for use by the disabled, who require assistance to lift up small workpieces from the floor or the ground and to transport these to desired positions. In this connection the device can also be used to facilitate the raising of objects from a lower to a higher surface, e.g. from a floor to a bench whereby the object, after having been swung into an upright position and moved to its correct level, can be moved by the user of the device to a bench by tilting or advancing the object, in which case stops 28 can be made removable. The support member can, for example, also be made as a sheet or similar, thereby constituting a table. The locking device 29 can naturally also be made to operate hydraulically or pneumatically and to be regulated by the operation of a control valve. Instead of a hydraulic system a pneumatic system might naturally be selected for the piston cylinders 11 and 14. Elements, other than the stop spar 36 may also be attached to the stops 28,—for example clamps or similar to hold the workpiece firmly in position.

I claim:

1. An apparatus for supporting a workpiece to be machined, in different positions, comprising: a work table on which the workpiece is to rest; a base member positioned at a base level, said base member comprising a fixed frame; a column which is tiltable about a first hinge on the frame, said column extending along a longitudinal axis and being a hydraulically or pneumatically expandable and retractable first piston cylinder system having a first cylinder and a piston with a first piston rod, said cylinder being pivotally mounted to said frame and said piston rod being connected to said work table, said work table being adjustable to different levels by expansion and contraction of said column and being rotatable between different rotating positions around the longitudinal axis of said column, said work table having support surfaces for the workpiece extending transversely to the longitudinal axis of the column; and a control contrivance attached between the frame and the column for adjusting the column between, and for holding the column in different tilting positions, including a lower end-position in which the work table is obliquely positioned relative to said base level and is able to contact a portion of said base level, and from which the workpiece is raisable to a desired higher level, said worktable having two end sections telescopingly inserted into said worktable, said end sections being lockable relative to said worktable in desired positions, and carrier elements being respectively connected to said end sections and projecting from the support surfaces of said worktable in a direction away from the column for supporting and retaining a workpiece placed on said worktable in all positions of said worktable.

2. An apparatus according to claim 1, comprising a locking device attached to an upper end of the cylinder, said locking device being movable between a position in which the work table is locked in a desired position and a position in which the work table is free to move.

3. An apparatus according to claim 2, wherein said locking device comprises two locking jaws for clamping the piston rod.

4. An apparatus according to any one of claims 1 to 3, wherein said control contrivance comprises a second cylinder and a second piston rod therein, a second hinge supporting said second cylinder pivotally at said frame at a distance from said first hinge, and a third hinge connecting an upper end of said second piston rod to said first cylinder at a distance from said first hinge.

5. An apparatus according to any one of claims 1–3, wherein said work table is in the shape of an "H" with a cross-piece which is connected to the first piston rod and and having two side-pieces respectively carrying the end sections and carrier elements.

* * * * *